United States Patent
Xu et al.

(10) Patent No.: US 10,560,920 B2
(45) Date of Patent: Feb. 11, 2020

(54) SC-MCCH RESOURCE CONFIGURATION METHOD, SYSTEM AND APPARATUS

(71) Applicant: ZTE CORPORATION, Shenzhen (CN)

(72) Inventors: Hui Xu, Shenzhen (CN); Zijiang Ma, Shenzhen (CN); Chen Lu, Shenzhen (CN); Yaying Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/753,267

(22) PCT Filed: May 30, 2016

(86) PCT No.: PCT/CN2016/083915
§ 371 (c)(1),
(2) Date: Feb. 17, 2018

(87) PCT Pub. No.: WO2017/028591
PCT Pub. Date: Feb. 23, 2017

(65) Prior Publication Data
US 2018/0242278 A1 Aug. 23, 2018

(30) Foreign Application Priority Data
Aug. 17, 2015 (CN) .......................... 2015 1 0504912

(51) Int. Cl.
*H04W 72/00* (2009.01)
*H04W 16/02* (2009.01)
(Continued)

(52) U.S. Cl.
CPC ........... *H04W 72/005* (2013.01); *H04W 4/06* (2013.01); *H04W 16/02* (2013.01);
(Continued)

(58) Field of Classification Search
CPC ..... H04W 72/005; H04W 4/06; H04W 72/12; H04W 72/042; H04W 16/02; H04L 12/189
See application file for complete search history.

(56) References Cited

U.S. PATENT DOCUMENTS

| | | | | |
|---|---|---|---|---|
| 2012/0008543 A1* | 1/2012 | Gou | .................. | H04W 52/0216 370/312 |
| 2012/0039228 A1* | 2/2012 | Wang | .................. | H04L 12/1845 370/311 |

(Continued)

FOREIGN PATENT DOCUMENTS

| | | |
|---|---|---|
| CN | 101370238 A | 2/2009 |
| CN | 101931885 A | 12/2010 |

(Continued)

OTHER PUBLICATIONS

European Search Report for European Application No. 16836455.2 dated Jul. 19, 2018, 9 pages.
(Continued)

*Primary Examiner* — Kodzovi Acolatse
*Assistant Examiner* — Jay L Vogel
(74) *Attorney, Agent, or Firm* — McDonald Hopkins LLC

(57) ABSTRACT

The technical solutions described herein provide a resource configuration method, system, and apparatus for a single-cell multicast control channel (SC-MCCH). An example method comprises: a base station sends a system broadcast message, wherein the system broadcast message carries configuration information of an SC-MCCH configured by the base station, the configuration information comprising: an SC-MCCH modification period (MP) and time-domain position information of the SC-MCCH; the base station sends frequency-domain scheduling information of the SC-MCCH over a physical downlink control channel (PDCCH) of a subframe where the SC-MCCH is located, wherein the
(Continued)

a base station sending a system broadcast message, wherein the system broadcast message carries configuration information of a single cell multicast control channel SC-MCCH configured by the base station, and the configuration information comprises: a modification period MP of the SC-MCCH and time domain position information where the SC-MCCH is located; and frequency domain scheduling information of the SC-MCCH sent by the base station on a physical downlink control channel PDCCHof a subframe in which the SC-MCCH is located, wherein the frequency domain scheduling information comprises at least one of: frequency domain position information of the SC-MCCH and a modulation and coding scheme MCS of the SC-MCCH ⸺ S202 frequency-domain scheduling information comprises at least one of: frequency-domain position information of the SC-MCCH and a modulation and coding scheme (MCS) of the SC-MCCH.

13 Claims, 9 Drawing Sheets

(51) Int. Cl.
H04W 72/12 (2009.01)
H04W 4/06 (2009.01)
H04W 72/04 (2009.01)
H04L 12/18 (2006.01)

(52) U.S. Cl.
CPC ......... *H04W 72/042* (2013.01); *H04W 72/12* (2013.01); *H04L 12/189* (2013.01)

(56) References Cited

U.S. PATENT DOCUMENTS

2012/0314642 A1* 12/2012 Xu .................. H04W 48/16
370/312
2017/0325277 A1* 11/2017 Fujishiro ................ H04W 4/06
2018/0020426 A1* 1/2018 Yi .......................... H04W 4/06
2018/0176744 A1* 6/2018 Li ........................... H04W 4/06

FOREIGN PATENT DOCUMENTS

EP          2425132 A2    2/2012
WO      2010118659 A1   10/2010

OTHER PUBLICATIONS

Gao, "Study on Support of single-cell point-to-multipoint transmission in LTE" 3GPP TSG RAN meeting #68 RP-150695, Malmo, Sweden, Jun. 15-18, 2015, pp. 1-8.
Huawei "New WI proposal: Support of single-cell point-to-multipoint transmission in LTE" 3GPP TSG RAN Meeting #68 RP-150721, Malmo, Sweden, Jun. 15-18, 2015, pp. 1-7.
Huawei, "SC-PTM configuration and operation" 3GPP TSG-RAN WG2 Meeting #91 R2-153378, Beijing, China, Aug. 24-28, 2015, pp. 1-6.

\* cited by examiner a base station sending a system broadcast message, wherein the system broadcast message carries configuration information of a single cell multicast control channel SC-MCCH configured by the base station, and the configuration information comprises: a modification period MP of the SC-MCCH and time domain position information where the SC-MCCH is located; and frequency domain scheduling information of the SC-MCCH sent by the base station on a physical downlink control channel PDCCH of a subframe in which the SC-MCCH is located, wherein the frequency domain scheduling information comprises at least one of: frequency domain position information of the SC-MCCH and a modulation and coding scheme MCS of the SC-MCCH    ⟋ S202

Fig. 3 a user equipment UE receiving a system broadcast message sent by a base station, wherein the system broadcast message carries configuration information of a single cell multicast control channel SC-MCCH configured by the base station, and the configuration information comprises: a modification period MP of the SC-MCCH and time domain position information where the SC-MCCH is located; and also receiving frequency domain scheduling information of the SC-MCCH sent by the base station on a physical downlink control channel PDCCH of a subframe in which the SC-MCCH is located, wherein the frequency domain scheduling information comprises at least one of: frequency domain position information of the SC-MCCH and a modulation and coding scheme MCS of the SC-MCCH    ⟋ S302

Fig. 4

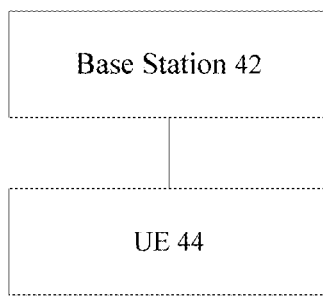

Fig. 5

Fig. 6

SC-MCCH RESOURCE CONFIGURATION METHOD, SYSTEM AND APPARATUS

CROSS-REFERENCE TO RELATED APPLICATION

This application is based upon and claims priority to PCT Application No. PCT/CN2016/083915, filed May 30, 2016, which is based upon and claims priority to Chinese Patent Application No. 201510504912.7, filed Aug. 17, 2015, the entire contents of which are incorporated herein by reference.

TECHNICAL FIELD

The present disclosure relates to the field of communication, and in particular to a resource configuration method, a resource configuration system and a resource configuration apparatus for a single cell multicast control channel SC-MCCH.

BACKGROUND

With the rapid development of the Internet and the popularization of large-screen multi-function mobile terminals, there has been a great deal of mobile data multimedia services and various high-bandwidth multimedia services such as video conferencing, television broadcasting, video on demand, advertising, online education, interaction games, etc. It can meet the demand of multi-service for mobile users, and also bring a new business growth point for mobile operators. These mobile data multimedia services require multiple users to receive the same data at the same time. Compared with conventional data services, the mobile data multimedia service has the characteristics of large data volume, long duration and sensitivity to delay.

In order to make effective use of mobile network resources, the 3rd Generation Partnership Project (3GPP) proposes Multimedia Broadcast Multicast Service (MBMS). This service is a technology of transmission of data from one data source to multiple target mobile terminals, which can realize the sharing of the resources of the network (including the core network and the access network) and improves the utilization of the network resources (especially the air interface resources). The MBMS service defined by 3GPP can not only achieve low-rate plain text message multicast and broadcast, but also achieve high-speed multimedia broadcast and multicast, providing a wide range of video, audio and multimedia services, which can undoubtedly conform to the future trend of mobile data development and provide a better business prospect for the development of 3G.

The MBMS service is characterized by a large amount of data traffic, a long receiving duration for mobile terminals, and a constant average data rate. Due to the above characteristics, the scheduling and control signaling configuration of the MBMS service are all semi-static, that is, the scheduling information and the control signaling information of the MBMS service are unchanged in a "long-term". Such information is transmitted through the MBMS control channel (MCCH) periodically, and collectively referred to as MCCH information. There may be multiple MCCHs in an evolved MBMS (eMBMS) system, each MCCH corresponds to a different MBSFN area, where only the control information of the MBMS service transmitted in the corresponding MBSFN area is carried.

An MBMS notification message is used to describe whether the MCCH information is changed. For a UE in idle mode (Radio Resource Control Idle, RRC Idle) or connected mode (RRC Connected), the UE only needs to monitor the MBMS notification message to know whether the MCCH information is changed. Therefore, the MCCH information may be selectively received, that is, only when the MCCH information is changed, new MCCH information is received. Since the amount of information of the MBMS notification message is much smaller than the MCCH information, user equipment (UE) selectively receiving the MCCH information, can effectively save resources and reduce power consumption. The MCCH notification information is periodically transmitted on the PDCCH of the designated MBSFN subframe, and the corresponding MBSFN subframe and transmission period are indicated by a system message (SIB13).

In the Long Term Evolution (LTE) system, a user equipment (or terminal) is notified that a session start will occur on an MBMS service or a counting request is initiated by a network side. The Downlink Control Information (DCI) and MBMS-Radio Network Temporary Identifier (M-RNTI) may be firstly transmitted on a Physical Downlink Control Channel (PDCCH). The UE further reads a specific MCCH message according to related information in the DCI, which is called an MCCH change notification mechanism. Specific service configuration parameters such as service ID, radio link control (RLC), media access control (MAC), and physical layer configuration parameters are transmitted on the MCCH.

At present, the MBMS technology is introduced in the Release 9 of the LTE system and is enhanced in Release 10 (R10). In R9, the control signaling of the MBMS service is transmitted separately from the user data, which are respectively called Control Plane (CP) and User Plane (UP). The control plane controls the sending of the user plane data by controlling the start, update and end of the service and realizes the sending of basic MBMS service. The MBMS service is sent in an MBSFN (MBMS Single Frequency Network) area of a fixed size (which may be statically or semi-statically configured). In R10, in order to improve resource utilization of the MBMS system and facilitate operator management, MBMS technology is enhanced to mainly include: counting and priority-based preemption mechanism.

3GPP puts forward a research topic of single cell MBMS in R13 of LTE-A. FIG. 1 is a schematic diagram of a single cell MBMS in the related art, and a single cell MBMS service is transmitted on a physical downlink shared channel PDSCH.

The PDCCH is the indication information for parsing PDSCH data. Therefore, in the time domain of the PDCCH, before the PDSCH (data field), the first 1-4 symbols of one subframe are occupied. FIG. 2 is a schematic diagram of a channel in which PDCCH occupies 3 symbols in a subframe. The information transmitted in the PDCCH is called downlink control information DCI, which is used to indicate information such as resource configuration of the PDSCH and uplink resource grant. The CRC of the tail of the PDCCH is 16 bits, and is scrambled with a specific radio network temporary identifier RNTI. The RNTI is used to identify the UE or for specific usage. The UE performs blind detection on the PDCCH of the received subframe. The blind detection is for the UE to search the bit sequence resulted from the descrambling without priori information to obtain the required control signaling. The advantage of blind detection is that no additional overhead occurs, and the disadvantage is the high detection complexity. In order to reduce the search complexity, TS36.213 defines the concept of search space. Each UE searches for control information in a particular search space, and each search space contains a set of Control Channel Elements (CCEs). The search space in LTE includes a common search space and a UE-specific search space.

The currently available solutions have the following problems. Single cell MBMS service scheduling is greatly different from multi-cell MBMS (MBSFN) scheduling: Single Cell-Multicast Control Channel (SC-MCCH) is carried and transmitted on the PDSCH, and the MCCH of the MBSFN area is carried and transmitted on a Physical Broadcast Channel (PMCH). At present, there is no method suitable for SC-MCCH resource configuration.

In the related art, there is no solution to the resource configuration method applicable to the SC-MCCH single cell multicast control channel, and no effective solution has been proposed so far.

This section provides background information related to the present invention which is not necessarily prior art.

SUMMARY

The present disclosure provides a resource configuration method, a resource configuration system and a resource configuration apparatus for a single cell multicast control channel SC-MCCH, to at least solve the problem that there is no resource configuration method applicable for the single cell multicast control channel SC-MCCH in the related art.

According to one aspect of the present disclosure, there is provided a resource configuration method for a single cell multicast control channel SC-MCCH, including: sending, by a base station, a system broadcast message, wherein the system broadcast message carries configuration information of a single cell multicast control channel SC-MCCH, and the configuration information includes: a modification period (MP) of the SC-MCCH and time domain position information where the SC-MCCH is located; and sending, by the base station, frequency domain scheduling information of the SC-MCCH on a physical downlink control channel (PDCCH), wherein the frequency domain scheduling information includes at least one of: frequency domain position information of the SC-MCCH and a modulation and coding scheme (MCS) of the SC-MCCH.

In one or more embodiments, the configuration information further includes at least one of: a repetition period (RP) of the SC-MCCH, configuration information of change notification information of the SC-MCCH and value tag information.

In one or more embodiments, the MP is for indicating a period for changing the SC-MCCH; the RP is for indicating a period for the SC-MCCH to repeat a transmission in one MP; the time domain position information where the SC-MCCH is located is for indicating the positions of the radio frame and radio subframe where the SC-MCCH is located; the configuration information of the change notification information of the SC-MCCH is for indicating the time domain position information where the change notification information of the SC-MCCH is located, and the time domain position information where the change notification information of the SC-MCCH is located includes the positions of the radio frame and radio subframe where the change notification information of the SC-MCCH is located; and the value tag information is for indicating the change notification information of the SC-MCCH.

In one or more embodiments, when the configuration information includes configuration information of change notification information of the SC-MCCH, the change notification information of the SC-MCCH is indicated by downlink control information DCI in the physical downlink control channel (PDCCH); and when the configuration information includes the value tag, the change notification information of the SC-MCCH is indicated by the value tag.

In one or more embodiments, when the change notification information of the SC-MCCH is indicated by the value tag, when the value of the value tag is different form the value of the value tag stored locally at the user equipment (UE), it indicates that the SC-MCCH is updated; and when the value of the value tag is the same as the value of the value tag stored locally at the UE, it indicates that the SC-MCCH is not updated.

In one or more embodiments, when the change notification information of the SC-MCCH is indicated by the downlink control information DCI, the method includes: when the change notification information of the SC-MCCH only indicates whether the SC-MCCH is updated, a first designated bit N in the DCI is for indicating whether the SC-MCCH is updated, where N=1 is for indicating that the SC-MCCH is updated, and N=0 is for indicating that the SC-MCCH is not updated, and N takes a value of 1 or 0; when the change notification information of the SC-MCCH not only indicates whether the SC-MCCH is updated, but also indicates a service type of the SC-MCCH, a first designated bit N in the DCI is for indicating whether the SC-MCCH is updated, where N=1 is for indicating that the SC-MCCH is updated, and N=0 is for indicating that the SC-MCCH is not updated; and a second designated bit M in the DCI is for indicating a type of service that is updated for the SC-MCCH, where M=1 is for indicating update of public safety (PS) service, and M=0 is for indicating update of a normal service, N takes a value of 1 or 0, and M takes a value of 1 or 0.

In one or more embodiments, the SC-MCCH is identified by a first radio network temporary identifier RNTI, and the change notification information of the SC-MCCH is identified by a second radio network temporary identifier RNTI.

According to another aspect of the present disclosure, there is provided a resource configuration method for a single cell multicast control channel SC-MCCH, including: receiving, by a user equipment (UE), a system broadcast message sent by a base station, wherein the system broadcast message carries configuration information of a single cell multicast control channel SC-MCCH, and the configuration information includes: a modification period (MP) of the SC-MCCH and time domain position information where the SC-MCCH is located; and receiving, by the UE, frequency domain scheduling information of the SC-MCCH sent by the base station on a physical downlink control channel (PDCCH), wherein the frequency domain scheduling information includes at least one of: frequency domain position information of the SC-MCCH and a modulation and coding scheme (MCS) of the SC-MCCH.

In one or more embodiments, the configuration information further includes at least one of: a repetition period (RP) of the SC-MCCH, configuration information of change notification information of the SC-MCCH and value tag information.

In one or more embodiments, the MP is for indicating a period for changing the SC-MCCH; the RP is for indicating a period for the SC-MCCH to repeat a transmission in one MP; the time domain position information where the SC-MCCH is located is for indicating the positions of the radio frame and radio subframe where the SC-MCCH is located; the configuration information of the change notification information of the SC-MCCH is for indicating the time domain position information where the change notification information of the SC-MCCH is located, and the time domain position information where the change notification information of the SC-MCCH is located includes the positions of the radio frame and radio subframe where the change notification information of the SC-MCCH is located; and the value tag information is for indicating the change notification information of the SC-MCCH.

In one or more embodiments, when the configuration information includes configuration information of change notification information of the SC-MCCH, the change notification information of the SC-MCCH is indicated by downlink control information DCI in the physical downlink control channel (PDCCH); and when the configuration information includes the value tag, the change notification information of the SC-MCCH is indicated by the value tag.

In one or more embodiments, after the user equipment (UE) receives the system broadcast message sent by the base station, the method further includes: determining, by the UE, whether the SC-MCCH is updated according to the configuration information; and when the SC-MCCH is updated, reading, by the UE, the updated information of the SC-MCCH.

In one or more embodiments, when the change notification information of the SC-MCCH is indicated by the value tag, determining by the UE whether the SC-MCCH is updated according to the configuration information includes: comparing, by the UE, the value of the value tag and the value of the value tag stored locally by the UE; when the value of the value tag is different from the value of the value tag stored locally at the UE, determining, by the UE, that the SC-MCCH is updated; and when the value of the UE is the same as the value of the value tag stored locally at the UE, determining, by the UE, that the SC-MCCH is not updated.

In one or more embodiments, when the change notification information of the SC-MCCH is indicated by the downlink control information DCI, determining by the UE whether the SC-MCCH is updated according to the configuration information includes: reading, by the UE, the configuration information of the change notification information of the SC-MCCH in the configuration information; monitoring, by the UE, the change notification information of the SC-MCCH at the position of the subframe where the SC-MCCH is located as indicated by the configuration information of the change notification information of the SC-MCCH; and determining, by the UE, whether the SC-MCCH is updated according to the change notification information of the SC-MCCH.

In one or more embodiments, determining by the UE whether the SC-MCCH is updated according to the change notification information of the SC-MCCH includes: acquiring, by the UE, a value of a first designated bit N in the DCI; when N is 1, determining, by the UE, that the SC-MCCH is updated; and when N is 0, determining, by the UE, that the SC-MCCH is not updated, and N takes a value of 1 or 0.

In one or more embodiments, after the UE determines whether the SC-MCCH is updated according to the configuration information, the method further includes: determining, by the UE, whether the service of the SC-MCCH is updated according to the DCI; and when the service of the SC-MCCH is updated, receiving, by the UE, the updated SC-MCCH information.

In one or more embodiments, determining by the UE whether the service of the SC-MCCH is updated according to the DCI includes: acquiring, by the UE, a value of a second designated bit M in the DCI; when M is 1, determining, by the UE, that the public safety (PS) service of the SC-MCCH is updated; and when M is 0, determining, by the UE, that the normal service of the SC-MCCH is updated, and M takes a value of 1 or 0.

In one or more embodiments, reading by the UE the updated information of the SC-MCCH includes: reading, by the UE, the updated SC-MCCH information from the starting time of the next MP according to the time domain position information of the SC-MCCH.

According to another aspect of the present disclosure, there is provided a resource configuration system for a single cell multicast control channel SC-MCCH, including: a base station and a user equipment (UE), wherein the base station is configured to send a system broadcast message to the UE, wherein the system broadcast message carries configuration information of a single cell multicast control channel SC-MCCH, and the configuration information includes: a modification period (MP) of the SC-MCCH and time domain position information where the SC-MCCH is located; and send frequency domain scheduling information of the SC-MCCH on a physical downlink control channel (PDCCH), wherein the frequency domain scheduling information includes at least one of: frequency domain position information of the SC-MCCH and a modulation and coding scheme (MCS) of the SC-MCCH; and the UE is configured to receive the system broadcast message and the frequency domain scheduling information which are sent by base station, and determine whether the SC-MCCH is updated according to the configuration information; and read the updated SC-MCCH information when the SC-MCCH is updated.

In one or more embodiments, the above configuration information further includes at least one of: a repetition period (RP) of the SC-MCCH, configuration information of change notification information of the SC-MCCH and value tag information.

According to another aspect of the present disclosure, there is provided a resource configuration apparatus for a single cell multicast control channel SC-MCCH, which is applied to a base station, and the apparatus including: a transmission module configured to send a system broadcast message, wherein the system broadcast message carries configuration information of a single cell multicast control channel SC-MCCH, the configuration information includes: a modification period (MP) of the SC-MCCH; time domain position information where the SC-MCCH is located; and frequency domain scheduling information of the SC-MCCH, which is sent on a physical downlink control channel (PDCCH), wherein the frequency domain scheduling information includes at least one of: frequency domain position information of the SC-MCCH; and a modulation and coding scheme (MCS) of the SC-MCCH.

In one or more embodiments, the configuration information further includes at least one of: a repetition period (RP) of the SC-MCCH, configuration information of change notification information of the SC-MCCH and value tag information.

According to another aspect of the present disclosure, there is provided a resource configuration apparatus for a single cell multicast control channel SC-MCCH, which is applied to a user equipment (UE), and the apparatus including: a receiving module configured to receive a system broadcast message sent by a base station, wherein the system broadcast message carries configuration information of a single cell multicast control channel SC-MCCH, the configuration information includes: a modification period (MP) of the SC-MCCH; time domain position information where the SC-MCCH is located; and frequency domain scheduling information of the SC-MCCH, which is sent by the base station on a physical downlink control channel (PDCCH), wherein the frequency domain scheduling information includes at least one of: frequency domain position information of the SC-MCCH; and a modulation and coding scheme (MCS) of the SC-MCCH.

In one or more embodiments, the configuration information further includes at least one of: a repetition period (RP) of the SC-MCCH, configuration information of the change notification information of the SC-MCCH and value tag information.

In one or more embodiments, the apparatus further includes: a determining module configured to determine whether the SC-MCCH is updated according to the configuration information; and a reading module configured to read the updated information of the SC-MCCH when the SC-MCCH is updated.

Another embodiment of the present disclosure provides a computer storage medium for storing executable instructions to implement the method according to the above embodiment.

Through the present disclosure, the base station sends the system broadcast message and the frequency domain scheduling information. The system broadcast message carries the configuration information of the single cell multicast control channel SC-MCCH. That is, the base station configures in the system broadcast message the configuration information of the single cell multicast control channel SC-MCCH. It can solve the problem that there is no resource configuration method applicable for single cell multicast control channel SC-MCCH in the related art, and can realize resource configuration for the SC-MCCH.

This section provides a summary of various implementations or examples of the technology described in the present disclosure, and is not a comprehensive disclosure of the full scope or all features of the disclosed technology.

BRIEF DESCRIPTION OF THE DRAWINGS

The drawings described herein are used to provide a further understanding of the present disclosure and constitute a part of the present application. The schematic embodiments and the descriptions of the present disclosure are used to explain the present disclosure, and do not constitute improper limitations to the present disclosure. In the drawings:

FIG. 3 is a flowchart of a resource configuration method for a single cell multicast control channel SC-MCCH according to one or more embodiments;

FIG. 4 is a first flowchart of a resource configuration method for a single cell multicast control channel SC-MCCH according to one or more embodiments;

FIG. 5 illustrates a resource configuration system for a single cell multicast control channel SC-MCCH according to one or more embodiments;

FIG. 6 is a block diagram illustrating a resource configuration apparatus for a single cell multicast control channel SC-MCCH according to one or more embodiments;

DETAILED DESCRIPTION

Figure 1:
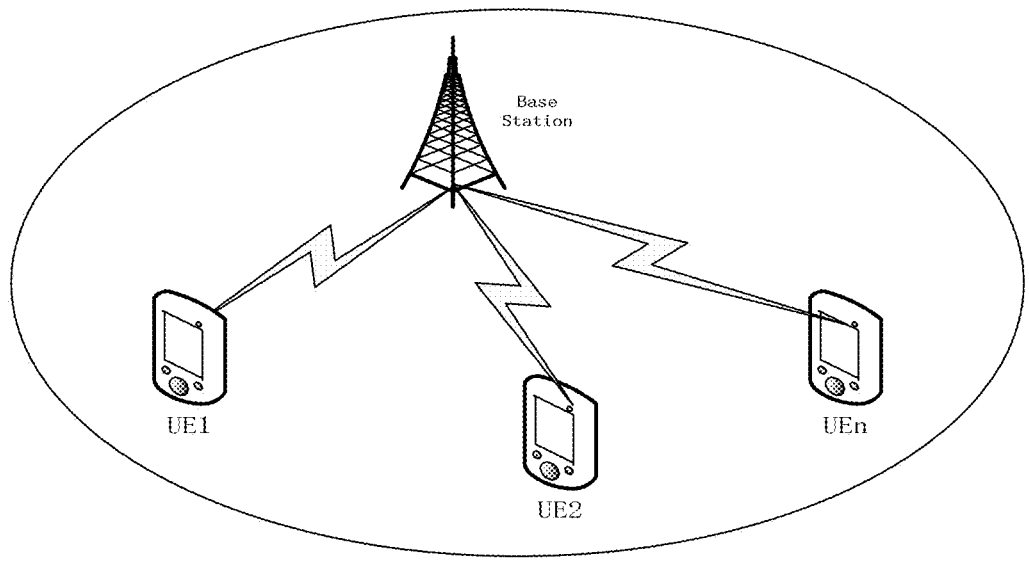
FIG. 1 is a schematic diagram of a single cell MBMS in the related art.
Figure 2:
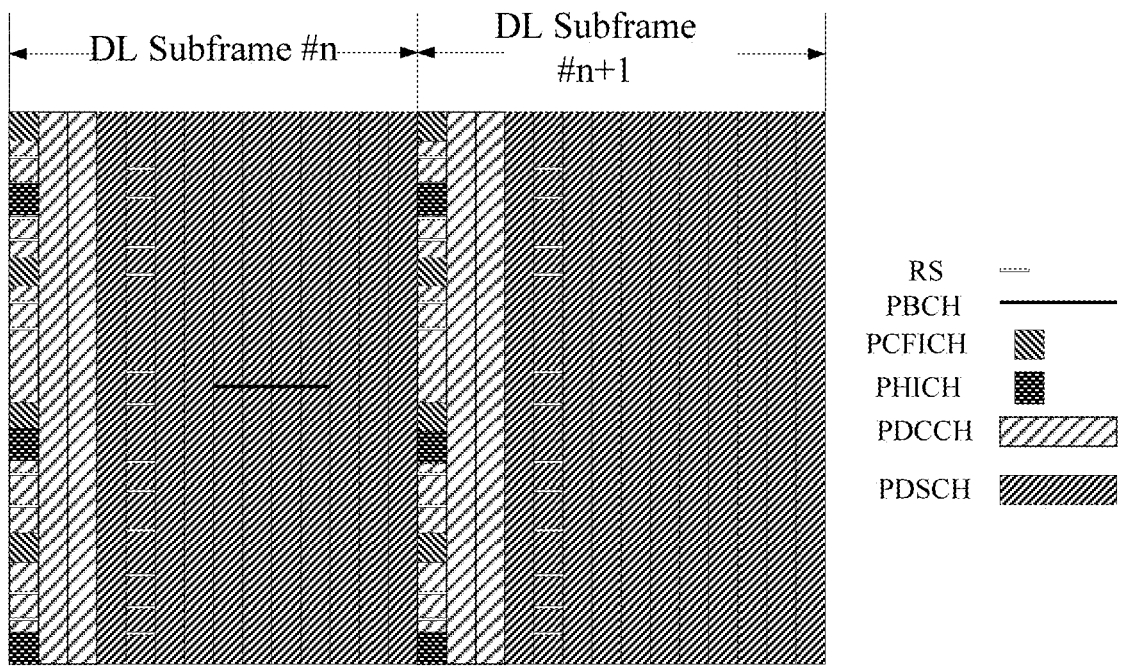
FIG. 2 is a schematic diagram of a channel in which a PDCCH occupies 3 symbols in a subframe in the related art.

Hereinafter, the present disclosure describes technical solutions with reference to the accompanying drawings and embodiments. It should be noted that, the embodiments in the present application and the features in the embodiments may be combined with each other without conflict.

It should be noted that the terms "first", "second" and the like in the description and claims as well as the above drawings of the present disclosure are used to distinguish similar objects, and are not necessarily used to describe a specific sequence or order.

In one or more embodiments, a resource configuration method for a single cell multicast control channel is provided. FIG. 3 is a flowchart of a resource configuration method for a single cell multicast control channel SC-MCCH according to one or more embodiments. As shown in FIG. 3, the method includes the following steps.

In Step S202, a base station sends a system broadcast message. The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is sent by the base station on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

It should be noted that, the above configuration information may also include at least one of: a repetition period (RP) of the SC-MCCH, configuration information of change notification information of the SC-MCCH and value tag information.

It should be noted that, the scheduling of the SC-MCCH includes time domain scheduling and frequency domain scheduling. The base station sends time domain scheduling information through the above mentioned system broadcast message. The time domain scheduling information may be the configuration information in the above embodiment. The base station sends the time domain scheduling information of the SC-MCCH on the physical downlink shared channel PDSCH of the unicast subframe where the SC-MCCH is located. For the frequency domain scheduling, the base station sends the frequency domain scheduling information of the SC-MCCH on the physical downlink control channel (PDCCH) of the subframe where the SC-MCCH is located, and/or through downlink control information on the physical downlink control channel (PDCCH) of the subframe where the SC-MCCH is located.

Through the above steps, the base station sends the system broadcast message and the frequency domain scheduling information. The system broadcast message carries the configuration information of the single cell multicast control channel SC-MCCH configured by the base station. That is, the base station configures in the system broadcast message the configuration information of the single cell multicast control channel SC-MCCH. Thus, it can solve the problem that there is no resource configuration method applicable for single cell multicast control channel SC-MCCH in the related art, and can realize resource configuration for the SC-MCCH.

In the embodiment of the present disclosure, the MP is used to indicate a period for changing the SC-MCCH. The RP is used to indicate a period for the SC-MCCH to repeat a transmission in one MP. The time domain position information where the SC-MCCH is located is used to indicate the positions of the radio frame and radio subframe where the SC-MCCH is located. The configuration information of change notification information of the SC-MCCH is used to indicate the time domain position information where change notification information of the SC-MCCH is located. The time domain position information where the change notification information of the SC-MCCH is located includes the positions of the radio frame and radio subframe where the change notification information of the SC-MCCH is located. The value tag information is used to indicate the change notification information of the SC-MCCH.

In the embodiment of the present disclosure, the above MCS is an MCS adopted by the SC-MCCH.

In the embodiment of the present disclosure, when the configuration information includes configuration information of change notification information of the SC-MCCH, the change notification information of the SC-MCCH is indicated by downlink control information DCI in the physical downlink control channel (PDCCH). When the configuration information includes the value tag, the change notification information of the SC-MCCH is indicated by the value tag.

In the embodiment of the present disclosure, when the change notification information of the SC-MCCH is indicated by the value tag, if the value of the value tag is different form the value of the value tag stored locally at the user equipment, it indicates that the SC-MCCH is updated; and if the value of the value tag is the same as the value of the value tag stored locally at the user equipment, it indicates that the SC-MCCH is not updated.

In the embodiment of the present disclosure, when the change notification information of the SC-MCCH is indicated by the downlink control information DCI, the method includes: when the change notification information of the SC-MCCH only indicates whether the SC-MCCH is updated, a first designated bit N in the DCI is used to indicate whether the SC-MCCH is updated, where N=1 is used to indicate that the SC-MCCH is updated, and N=0 is used to indicate that the SC-MCCH is not updated. N takes a value of 1 or 0. When the change notification information of the SC-MCCH not only indicates whether the SC-MCCH is updated, but also indicates the service type of the SC-MCCH, a first designated bit N in the DCI is used to indicate whether the SC-MCCH is updated, where N=1 is used to indicate that the SC-MCCH is updated, and N=0 is used to indicate that the SC-MCCH is not updated; and a second designated bit M in the DCI is used to indicate a type of service that is updated for the SC-MCCH, where M=1 is used for indicating update of public safety (PS) service, and M=0 is used for indicating update of a normal service. N takes a value of 1 or 0, and M takes a value of 1 or 0.

In the embodiment of the present disclosure, the above SC-MCCH may be identified by using a first radio network temporary identifier RNTI. The change notification information of the SC-MCCH may be identified by using a second radio network temporary identifier RNTI.

In the embodiment, a resource configuration method for a single cell multicast control channel SC-MCCH is provided. FIG. 4 is a first flowchart of a resource configuration method for a single cell multicast control channel according to one or more embodiments. As shown in FIG. 4, the method includes the following steps:

In Step S302, a user equipment (UE) receives a system broadcast message sent by a base station. The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is received by the UE from the base station on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

In the embodiment of the present disclosure, the configuration information may further include at least one of: a repetition period (RP) of the SC-MCCH, configuration information of change notification information of the SC-MCCH and value tag information.

It should be noted that, the scheduling of the SC-MCCH includes time domain scheduling and frequency domain scheduling. The base station sends time domain scheduling information through the above mentioned system broadcast message. The time domain scheduling information may be the configuration information in the above embodiment. The base station sends the time domain scheduling information of the SC-MCCH on the physical downlink shared channel PDSCH of the unicast subframe where the SC-MCCH is located. For the frequency domain scheduling, the base station sends the frequency domain scheduling information of the SC-MCCH on the physical downlink control channel (PDCCH) of the subframe where the SC-MCCH is located, and/or through downlink control information on the physical downlink control channel (PDCCH) of the subframe where the SC-MCCH is located.

Through the above steps, the user equipment (UE) receives the system broadcast message and the frequency domain scheduling information sent from the base station. The system broadcast message carries the configuration information of the single cell multicast control channel SC-MCCH configured by the base station. That is, the base station configures in the system broadcast message the configuration information of the single cell multicast control channel SC-MCCH. Thus, it can solve the problem that there is no resource configuration method applicable for single cell multicast control channel SC-MCCH in the related art, and can realize resource configuration for the SC-MCCH.

In the embodiment of the present disclosure, the MP is used to indicate a period for changing the SC-MCCH. The RP is used to indicate a period for the SC-MCCH to repeat a transmission in one MP. The time domain position information where the SC-MCCH is located is used to indicate the positions of the radio frame and radio subframe where the SC-MCCH is located. The configuration information of change notification information of the SC-MCCH is used to indicate the time domain position information where change notification information of the SC-MCCH is located. The time domain position information where the change notification information of the SC-MCCH is located includes the positions of the radio frame and radio subframe where the change notification information of the SC-MCCH is located. The value tag information is used to indicate the change notification information of the SC-MCCH.

In the embodiment of the present disclosure, the MCS is a MCS adopted by the SC-MCCH.

In the embodiment of the present disclosure, when the configuration information includes configuration information of change notification information of the SC-MCCH, the change notification information of the SC-MCCH is indicated by downlink control information DCI in the physical downlink control channel (PDCCH). When the configuration information includes the value tag, the change notification information of the SC-MCCH is indicated by the value tag.

In the embodiment of the present disclosure, after the user equipment (UE) receives the system broadcast message sent by the base station, the above method further includes the following step. The UE determines whether the SC-MCCH is updated according to the configuration information. When the SC-MCCH is updated, the UE reads the updated information of the SC-MCCH.

In the embodiment of the present disclosure, when the change notification information of the SC-MCCH is indicated by the value tag, the UE determining whether the SC-MCCH is updated according to the configuration information includes the following steps. The UE compares the value of the value tag and the value of the value tag stored locally by the UE. When the value of the value tag is different from the value of the value tag stored locally at the user equipment, the UE determines that the SC-MCCH is updated. When the value of the UE is the same as the value of the value tag stored locally at the user equipment, the UE determines that the SC-MCCH is not updated.

In the embodiment of the present disclosure, when the change notification information of the SC-MCCH is indicated by the downlink control information DCI, the UE determining whether the SC-MCCH is updated according to the configuration information includes the following steps. The UE reads the configuration information of the change notification information of the SC-MCCH in the configuration information. The UE monitors the change notification information of the SC-MCCH at the position of the subframe where the SC-MCCH is located as indicated by the configuration information of the change notification information of the SC-MCCH. The UE determines whether the SC-MCCH is updated according to the change notification information of the SC-MCCH.

It should be noted that, monitoring in the embodiment of the present disclosure means that the UE performs a mask operation on a CRC of a subframe of the change notification information of the SC-MCCH with the above SM-RNTI, and verifies the CRC. If the verification is passed, it is the subframe required, and the UE may further read the content of the DCI in the PDCCH of the subframe, and the content of the DCI is the change notification information of the SC-MCCH.

In the embodiment of the present disclosure, the UE determining whether the SC-MCCH is updated according to the change notification information of the SC-MCCH includes the following steps. The UE acquires a value of a first designated bit N in the DCI. When N is 1, the UE determines that the SC-MCCH is updated. When N is 0, the UE determines that the SC-MCCH is not updated. N takes a value of 1 or 0.

In the embodiment of the present disclosure, after the UE determines whether the SC-MCCH is updated according to the configuration information, the method further includes the following steps. The UE determines whether the service of the SC-MCCH is updated according to the DCI. When the service of the SC-MCCH is updated, the UE receives the updated SC-MCCH information.

In the embodiment of the present disclosure, the UE determining whether the service of the SC-MCCH is updated according to the DCI includes the following steps. The UE acquires a value of a second designated bit M in the DCI. When M is 1, the UE determines that the public safety (PS) service of the SC-MCCH is updated. When M is 0, the UE determines that the normal service of the SC-MCCH is updated. M takes a value of 1 or 0.

In the embodiment of the present disclosure, the UE reading the updated SC-MCCH information includes the following step. The UE reads the updated SC-MCCH information from the starting time of the next MP according to the time domain position information of the SC-MCCH.

Through the above description of the embodiments, those skilled in the art can clearly understand that the method according to the above embodiment may be implemented by software in combination with a hardware platform, and certainly may also be implemented by hardware. Based on this understanding, the technical solution of the present disclosure essentially, or the part contributing to the prior art, may be embodied in the form of a software product stored on a storage medium such as a ROM/RAM, a magnetic disk, a compact disk, including instructions to enable a terminal device (such as a mobile phone, a computer, a server, or a network device, etc.) to perform the method according to the embodiments of the present disclosure.

In an embodiment, a resource configuration system for a single cell multicast control channel SC-MCCH is provided. FIG. 5 is a resource configuration system for a single cell multicast control channel according to one or more embodiments. As shown in FIG. 5, the system includes a base station 42 and a user equipment (UE) 44.

The base station 42 is configured to send a system broadcast message to the user equipment (UE). The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is sent on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

It should be noted that, the above configuration information may also include at least one of: a repetition period (RP)

of the SC-MCCH, configuration information of change notification information of the SC-MCCH and value tag information.

The UE 44 is configured to receive the system broadcast message and the frequency domain scheduling information which are sent by base station 42, determine whether the SC-MCCH is updated according to the configuration information; and read the updated SC-MCCH information when the SC-MCCH is updated.

It should be noted that, the scheduling of the SC-MCCH includes time domain scheduling and frequency domain scheduling. The base station sends time domain scheduling information through the above mentioned system broadcast message. The time domain scheduling information may be the configuration information in the above embodiment. The base station sends the time domain scheduling information of the SC-MCCH on the physical downlink shared channel PDSCH of the unicast subframe where the SC-MCCH is located. For the frequency domain scheduling, the base station sends the frequency domain scheduling information of the SC-MCCH on the physical downlink control channel (PDCCH) of the subframe where the SC-MCCH is located, and/or through downlink control information on the physical downlink control channel (PDCCH) of the subframe where the SC-MCCH is located.

Through the above system, the base station sends the system broadcast message and the frequency domain scheduling information. The system broadcast message carries the configuration information of the single cell multicast control channel SC-MCCH configured by the base station. That is, the base station configures in the system broadcast message the configuration information of the single cell multicast control channel SC-MCCH. Then, the base station sends the system broadcast message carrying the configuration information to the UE. Thus, it can solve the problem that there is no resource configuration method applicable for single cell multicast control channel SC-MCCH in the related art, and can realize resource configuration for the SC-MCCH.

In the embodiment of the present disclosure, the MP is used to indicate a period for changing the SC-MCCH. The RP is used to indicate a period for the SC-MCCH to repeat a transmission in one MP. The time domain position information where the SC-MCCH is located is used to indicate the positions of the radio frame and radio subframe where the SC-MCCH is located. The configuration information of change notification information of the SC-MCCH is used to indicate the time domain position information where change notification information of the SC-MCCH is located. The time domain position information where the change notification information of the SC-MCCH is located includes the positions of the radio frame and radio subframe where the change notification information of the SC-MCCH is located. The value tag information is used to indicate the change notification information of the SC-MCCH.

In the embodiment of the present disclosure, the above MCS is a MCS adopted by the SC-MCCH.

In the embodiment of the present disclosure, when the configuration information includes configuration information of change notification information of the SC-MCCH, the change notification information of the SC-MCCH is indicated by downlink control information DCI in the physical downlink control channel (PDCCH). When the configuration information includes the value tag, the change notification information of the SC-MCCH is indicated by the value tag.

In the embodiment of the present disclosure, when the change notification information of the SC-MCCH is indicated by the value tag, if the value of the value tag is different form the value of the value tag stored locally at the user equipment, it indicates that the SC-MCCH is updated; and if the value of the value tag is the same as the value of the value tag stored locally at the user equipment, it indicates that the SC-MCCH is not updated.

In the embodiment of the present disclosure, when the change notification information of the SC-MCCH is indicated by the downlink control information DCI, the method includes: when the change notification information of the SC-MCCH only indicates whether the SC-MCCH is updated, a first designated bit N in the DCI is used to indicate whether the SC-MCCH is updated, where N=1 is used to indicate that the SC-MCCH is updated, and N=0 is used to indicate that the SC-MCCH is not updated. N takes a value of 1 or 0. When the change notification information of the SC-MCCH not only indicates whether the SC-MCCH is updated, but also indicates the service type of the SC-MCCH, a first designated bit N in the DCI is used to indicate whether the SC-MCCH is updated, where N=1 is used to indicate that the SC-MCCH is updated, and N=0 is used to indicate that the SC-MCCH is not updated; and a second designated bit M in the DCI is used to indicate a type of service that is updated for the SC-MCCH, where M=1 is used for indicating update of public safety (PS) service, and M=0 is used for indicating update of a normal service. N takes a value of 1 or 0, and M takes a value of 1 or 0.

In the embodiment of the present disclosure, the above SC-MCCH may be identified by using a first radio network temporary identifier RNTI. The change notification information of the SC-MCCH may be identified by using a second radio network temporary identifier RNTI.

In the embodiment of the present disclosure, the base station 42 is further configured to send a SC-MCCH message and SC-MTCH service data, and scramble the CRC of the subframe of the change notification information of the SC-MCCH and the subframe of the SC-MTCH respectively with SM RNTI and SC-MCCH RNTI.

In one or more embodiments, a resource configuration apparatus for a single cell multicast control channel is further provided, which is configured to implement the foregoing embodiments. The same description will not be repeated. As used below, the term "module" may be a combination of software and/or hardware that achieves a predetermined function. Although the apparatus described in the following embodiment is preferably implemented in software, the implementation of hardware or a combination of software and hardware is also possible and contemplated.

FIG. 6 is a block diagram illustrating a resource configuration apparatus for a single cell multicast control channel SC-MCCH according to one or more embodiments. As shown in FIG. 6, the apparatus is applied to a base station, and the apparatus includes a transmission module 52, configured to send a system broadcast message. The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is sent on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

In the embodiment of the present disclosure, the above configuration information may also include at least one of: a repetition period (RP) of the SC-MCCH, configuration information of change notification information of the SC-MCCH and value tag information.

Through the above apparatus, the transmission module 52 in the base station sends the system broadcast message and the frequency domain scheduling information. The system broadcast message carries the configuration information of the single cell multicast control channel SC-MCCH configured by the base station. That is, the base station configures in the system broadcast message the configuration information of the single cell multicast control channel SC-MCCH. Thus, it can solve the problem that there is no resource configuration method applicable for single cell multicast control channel SC-MCCH in the related art, and can realize resource configuration for the SC-MCCH.

In the embodiment of the present disclosure, the MP is used to indicate a period for changing the SC-MCCH. The RP is used to indicate a period for the SC-MCCH to repeat a transmission in one MP. The time domain position information where the SC-MCCH is located is used to indicate the positions of the radio frame and radio subframe where the SC-MCCH is located. The configuration information of change notification information of the SC-MCCH is used to indicate the time domain position information where change notification information of the SC-MCCH is located. The time domain position information where the change notification information of the SC-MCCH is located includes the positions of the radio frame and radio subframe where the change notification information of the SC-MCCH is located. The value tag information is used to indicate the change notification information of the SC-MCCH.

In the embodiment of the present disclosure, the above MCS is a MCS adopted by the SC-MCCH.

In the embodiment of the present disclosure, when the configuration information includes configuration information of change notification information of the SC-MCCH, the change notification information of the SC-MCCH is indicated by downlink control information DCI in the physical downlink control channel (PDCCH). When the configuration information includes the value tag, the change notification information of the SC-MCCH is indicated by the value tag.

In the embodiment of the present disclosure, when the change notification information of the SC-MCCH is indicated by the value tag, if the value of the value tag is different form the value of the value tag stored locally at the UE, it indicates that the SC-MCCH is updated; and if the value of the value tag is the same as the value of the value tag stored locally at the UE, it indicates that the SC-MCCH is not updated.

In the embodiment of the present disclosure, when the change notification information of the SC-MCCH is indicated by the downlink control information DCI, the method includes: when the change notification information of the SC-MCCH only indicates whether the SC-MCCH is updated, a first designated bit N in the DCI is used to indicate whether the SC-MCCH is updated, where N=1 is used to indicate that the SC-MCCH is updated, and N=0 is used to indicate that the SC-MCCH is not updated. N takes a value of 1 or 0. When the change notification information of the SC-MCCH not only indicates whether the SC-MCCH is updated, but also indicates the service type of the SC-MCCH, a first designated bit N in the DCI is used to indicate whether the SC-MCCH is updated, where N=1 is used to indicate that the SC-MCCH is updated, and N=0 is used to indicate that the SC-MCCH is not updated; and a second designated bit M in the DCI is used to indicate a type of service that is updated for the SC-MCCH, where M=1 is used for indicating update of public safety (PS) service, and M=0 is used for indicating update of a normal service. N takes a value of 1 or 0, and M takes a value of 1 or 0.

In the embodiment of the present disclosure, the above SC-MCCH may be identified by using a first radio network temporary identifier RNTI. The change notification information of the SC-MCCH may be identified by using a second radio network temporary identifier RNTI.

Figure 7:
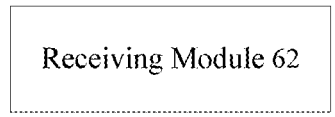
FIG. 7 is a first block diagram illustrating a resource configuration apparatus for a single cell multicast control channel SC-MCCH according to one or more embodiments.

In an embodiment, a resource configuration apparatus for a single cell multicast control channel SC-MCCH is further provided. FIG. 7 is a first block diagram illustrating a resource configuration apparatus for a single cell multicast control channel according to one or more embodiments. As shown in FIG. 7, the apparatus is applied to a user equipment, and the apparatus includes a receiving module 62, configured to receive a system broadcast message sent by a base station. The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is sent by the base station on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

In the embodiment of the present disclosure, the configuration information may further include at least one of: a repetition period (RP) of the SC-MCCH, configuration information of change notification information of the SC-MCCH and value tag information.

Through the above apparatus, the base station sends the system broadcast message. The system broadcast message carries the configuration information of the single cell multicast control channel SC-MCCH configured by the base station. That is, the base station configures in the system broadcast message the configuration information of the single cell multicast control channel SC-MCCH. Thus, it can solve the problem that there is no resource configuration method applicable for single cell multicast control channel SC-MCCH in the related art, and can realize resource configuration for the SC-MCCH.

In the embodiment of the present disclosure, the MP is used to indicate a period for changing the SC-MCCH. The RP is used to indicate a period for the SC-MCCH to repeat a transmission in one MP. The time domain position information where the SC-MCCH is located is used to indicate the positions of the radio frame and radio subframe where the SC-MCCH is located. The configuration information of change notification information of the SC-MCCH is used to indicate the time domain position information where change notification information of the SC-MCCH is located. The time domain position information where the change notification information of the SC-MCCH is located includes the positions of the radio frame and radio subframe where the change notification information of the SC-MCCH is located. The value tag information is used to indicate the change notification information of the SC-MCCH.

In the embodiment of the present disclosure, the MCS is a MCS adopted by the SC-MCCH.

In the embodiment of the present disclosure, when the configuration information includes configuration information of change notification information of the SC-MCCH, the change notification information of the SC-MCCH is indicated by downlink control information DCI in the physical downlink control channel (PDCCH). When the configuration information includes the value tag, the change notification information of the SC-MCCH is indicated by the value tag.

Figure 8:
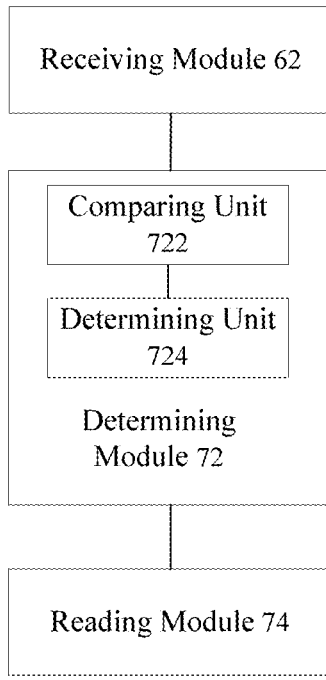
FIG. 8 is a second block diagram illustrating a resource configuration apparatus for a single cell multicast control channel SC-MCCH according to one or more embodiments.

In the embodiment of the present disclosure, FIG. 8 is a second block diagram illustrating a resource configuration apparatus for a single cell multicast control channel SC-MCCH according to one or more embodiments. The above apparatus further includes: a determining module 72 configured to determine whether the SC-MCCH is updated according to the configuration information; and a reading module 74 configured to read the updated information of the SC-MCCH when the SC-MCCH is updated.

In the embodiment of the present disclosure, when the change notification information of the SC-MCCH is indicated by the value tag, the above determining module 72 includes: a comparing unit 722, configured to compare the value of the value tag and the value of the value tag stored locally by the UE; and a determining unit 724 configured to, when the value of the value tag is different from the value of the value tag stored locally at the user equipment, determine that the SC-MCCH is updated, and when the value of the value tag is the same as the value of the value tag stored locally at the user equipment, determine that the SC-MCCH is not updated.

In the embodiment of the present disclosure, when the change notification information of the SC-MCCH is indicated by the downlink control information DCI, the above determining module 72 is further configured to read the configuration information of the change notification information of the SC-MCCH in the configuration information; monitor the change notification information of the SC-MCCH at the position of the subframe where the SC-MCCH is located as indicated by the configuration information of the change notification information of the SC-MCCH; and determine whether the SC-MCCH is updated according to the change notification information of the SC-MCCH.

Figure 9:
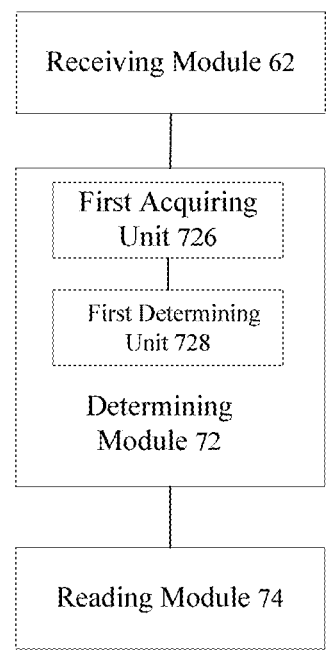
FIG. 9 is a third block diagram illustrating a resource configuration apparatus for a single cell multicast control channel SC-MCCH according to one or more embodiments.

In the embodiment of the present disclosure, FIG. 9 is a third block diagram illustrating a resource configuration apparatus for a single cell multicast control channel SC-MCCH according to one or more embodiments. As shown in FIG. 9, the above determining module 72 includes: a first acquiring unit 726 configured to acquire a value of a first designated bit N in the DCI; and a first determining unit 728 configured to determine that the SC-MCCH is updated when N is 1; and determine that the SC-MCCH is not updated when N is 0. N takes a value of 1 or 0.

The above determining module 72 is further configured to determine whether the service of the SC-MCCH is updated according to the DCI; and when the service of the SC-MCCH is updated, receive the updated SC-MCCH information.

The above first acquiring unit 726 may also acquire a value of a second designated bit M in the DCI. The first determining unit 728 is configured in the following manner: the UE determines that the public safety (PS) service of the SC-MCCH is updated when M is 1, and the UE determines that normal service of the SC-MCCH is updated when M is 0. M takes a value of 1 or 0.

The above reading module 74 is further configured to read the updated SC-MCCH information from the starting time of the next MP according to the time domain position information of the SC-MCCH.

It should be noted that, each of the foregoing modules may be implemented by software or hardware, and the latter may be implemented by, but not limited to, the foregoing modules being all located in the same processor; or the foregoing modules being respectively located in multiple processors.

For a better understanding, further description is now provided with reference to the one or more foregoing embodiments.

The present disclosure provides a configuration method for a single cell multicast control channel SC-MCCH, including: indicating configuration information of the SC-MCCH on a cell broadcast message SC-PTM. The configuration information includes: a modification period (MP) of the SC-MCCH, time domain position information where the SC-MCCH is located and a modulation and coding scheme (MCS) of the SC-MCCH. In addition, the configuration information also includes at least one of: a repetition period (RP) of the SC-MCCH, configuration information of change notification information of the SC-MCCH and value tag information.

Figure 10:
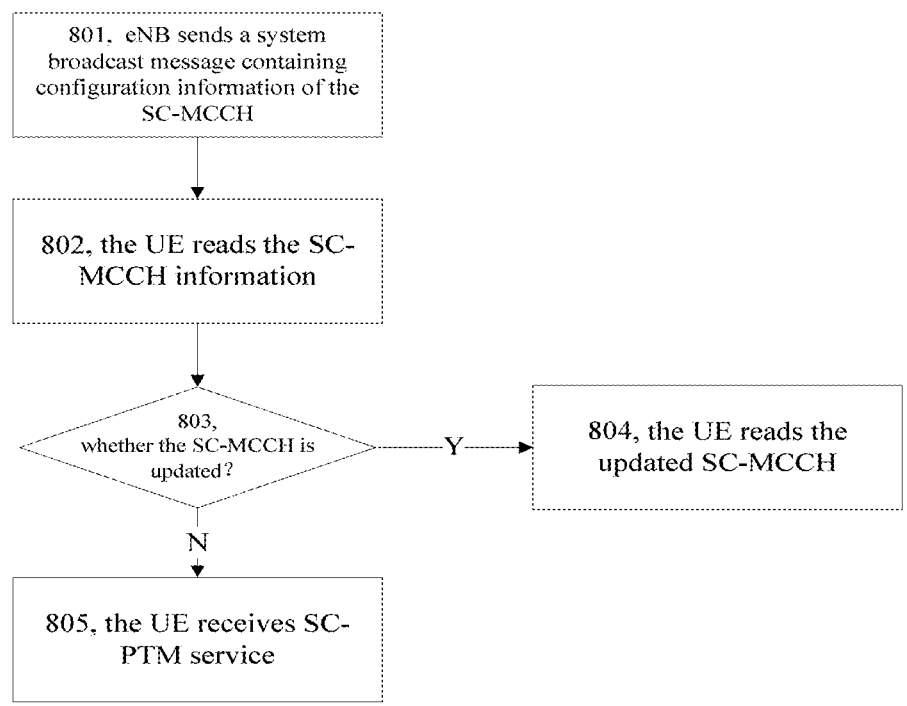
FIG. 10 is a flow chart of a configuration method for a single cell multicast control channel SC-MCCH according to one or more embodiments.

FIG. 10 is a flow chart of a configuration method for a single cell multicast control channel SC-MCCH according to one or more embodiments. As shown in FIG. 10, the method includes the following steps.

In Step 801, the base station eNB sends a system broadcast message containing configuration information of the SC-MCCH.

The above eNB refers to the eNB where a cell sending a single cell point-to-multipoint SC-PTM service is located. The above SC-MCCH is a single cell multicast control channel The SC-MCCH is used to indicate related configuration information of a single cell multicast traffic channel SC-MTCH. The above configuration information is configuration information related to the SC-MCCH. The above configuration information includes: a modification period (MP) of the SC-MCCH, and time domain position information where the SC-MCCH is located.

It should be noted that the configuration information may further include at least one of: a repetition period (RP) of the SC-MCCH, configuration information of change notification information of the SC-MCCH and value tag information.

MP indicates a period during which the SC-MCCH may be changed. MP=one of {320 ms, 640 ms, 1280 ms, 2560 ms, 5120 ms, 10240 ms}. RP indicates a period for the SC-MCCH to repeat a transmission in one MP. RP=one of {160 ms, 320 ms, 640 ms, 1280 ms, 2560 ms}.The time domain position information of the SC-MCCH includes the radio frame and radio subframe of the SC-MCCH (that is, the radio frame and radio subframe where the SC-MCCH is located). The subframe is a unicast subframe. The MCS of the SC-MCCH refers to an MCS of a subframe in which the SC-MCCH is located, and generally is indicated by an index number corresponding to the MCS.

It should be noted that, the above MP and RP may take smaller values as desired, but satisfying the following condition: the value of MP is greater than the value of RP.

The change notification information of the SC-MCCH may be indicated by any one of the following: 1) the value tag, and 2) downlink control information DCI in the PDCCH.

If the change notification information of the SC-MCCH is indicated by the value tag, an integer field sc-mcch Value Tag is set in the system broadcast message for indicating configuration of the SC-MCCH, and the field takes a value (0 . . . 31). Each time the SC-MCCH is updated, the eNB sets a new sc-mcch Value Tag=Original sc-mcch Value Tag+1. Each time the UE reads the configuration information of the SC-MCCH, the UE stores the value of sc-mcch Value Tag. If the UE finds that the value of sc-mcch Value Tag in the current system broadcast message is different from the value of sc-mcch Value Tag stored locally, it indicates that the SC-MCCH is updated, otherwise it indicates that the SC-MCCH is not changed.

If the change notification information of the SC-MCCH is indicated by the DCI, a specific RNTI is first allocated to the change notification information of the SC-MCCH. If SM-RNTI=FFFC, since the SC-MCCH is transmitted through PDSCH, and the frequency domain is scheduled through PDCCH, a RNTI needs to be allocated for the SC-MCCH in advance, such as SC-MCCH RNTI=FFFB. It is also possible that SM-RNTI=FFFB, and SC-MCCH RNTI=FFFC. The configuration information of the change notification information of the SC-MCCH on the system broadcast message indicates transmitting time domain position information of the change notification information of the SC-MCCH, such as a time domain frame position, a subframe index and a number of times the notification information being repeated in one SC-MCCH modification period.

Specifically, when the change notification information of the SC-MCCH is placed on the DCI in the PDCCH of the time domain subframe, and may take DCI format-1c, then a) if the notification information only indicates whether the SC-MCCH is updated, a bit N in the DCI is used to indicate whether the SC-MCCH is updated. N=1 means that the SC-MCCH is updated in the next SC-MCCH MP, and N=0 means that the SC-MCCH is not changed; b) if in the DCI it may also indicate a type of service, if two bits N is used to indicate, N1 indicates whether the SC-MCCH is updated, and N2 indicates the type of the updated service, for example, N2=1 means that the public safety (PS) service is updated, and N2=0 means that the normal service is updated. Further, more than two bits may be used in the DCI to indicate more update information.

The system broadcast message is an existing system broadcast message, such as SIB13 or SIB15, or a new system broadcast message dedicated to SC-PTM. If the system broadcast message is SIB13, the above related configuration information of the SC-MCCH is added to the content of the existing SIB13.

In Step 802, the UE receives the SC-MCCH information.

The UE monitors and receives required SC-MCCH information at a corresponding position according to the indication of the SC-MCCH configuration information in the system broadcast message. The UE may read SC-MCCH information after it is turned on, or after it reselects/switches to a new cell. Alternatively, the UE may monitor the change notification information of the SC-MCCH according to the configuration information of the change notification information of the SC-MCCH.

The frequency domain scheduling information of the SC-MCCH is transmitted by the base station through the PDCCH of a subframe where the SC-MCCH is located. Specifically, frequency domain scheduling information of the SC-MCCH is transmitted through the downlink control information DCI in the PDCCH. The frequency domain scheduling information may include at least one of: frequency domain position information of the SC-MCCH; and a modulation and coding scheme (MCS) of the SC-MCCH.

The DCI at least includes: scheduling information of the SC-MCCH in the frequency domain. The UE uses the pre-allocated SC-MCCH RNTI to detect the SC-MCCH subframe indicated in the system message. If it is detected, it means that the subframe contains the required SC-MCCH information.

In the above embodiment, the UE has MBMS receiving capability and is interested in receiving MBMS service. The UE is in a RRC-Connected or RRC-Idle mode.

In Step 803, the UE determines whether the SC-MCCH is updated, and if SC-MCCH is updated, the process proceeds to Step 804, otherwise the process turns to Step 805.

The UE detects a PDCCH at a position of a subframe of the change notification information of the SC-MCCH as indicated in the system broadcast message. The detection refers to performing a mask operation on a subframe CRC by using an SM-RNTI and verifying the CRC. If the verification is passed, the PDDCH is the PDDCH required. The UE further reads the content of the DCI in the PDCCH. If a bit N corresponding to the SC-MCCH change notification information in the DCI is 1, it indicates that the SC-MCCH is updated in the next modification period, and N=0 indicates that there is no update.

In Step 804, the UE reads the updated SC-MCCH information.

The UE reads the updated SC-MCCH information immediately at the start of the next SC-MCCH modification period according to the SC-MCCH time domain position information indicated in the system broadcast message.

In Step 805, the UE receives required services according to the existing SC-MCCH information.

The UE reads the SC-MTCH time domain configuration information in the existing SC-MCCH information, and further reads the required SC-MTCH data according to the time domain configuration information.

First Embodiment

Figure 11:
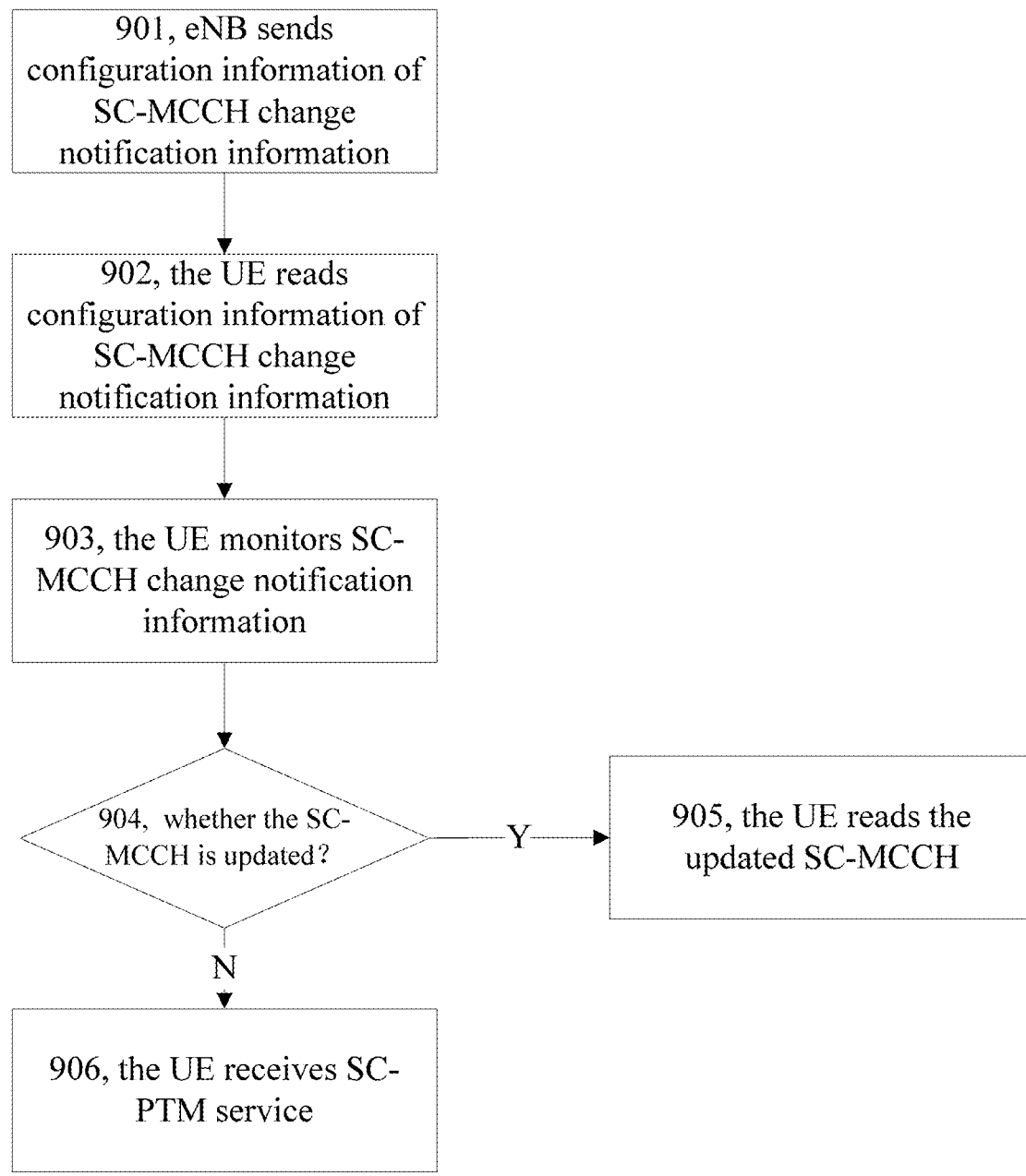
FIG. 11 is a flow chart of a first embodiment of the present disclosure.

The scenario in the embodiment is that the SC-MCCH change notification information is indicated by DCI information. FIG. 11 is a flowchart of the first embodiment of the present disclosure. As shown in FIG. 11, the first embodiment includes the following steps.

In Step 901, the base station eNB indicates configuration information of SC-MCCH change notification information through a system broadcast message.

The system broadcast message is an existing MBMS system message, such as SIB13 or SIB15. The SC-MCCH is an MCCH corresponding to a single cell SC-PTM, and the configuration information of the SC-MCCH change notification information is time domain position information where the SC-MCCH change notification information is located. The time domain position includes: a frame period, a subframe position, and a repetition number of change notifications in one SC-MCCH modification period.

If the SC-MCCH change notification information is indicated by DCI, a specific RNTI is first allocated to the change notification information of the SC-MCCH. If SM-RNTI=FFFC, since the SC-MCCH is transmitted through PDSCH, and the frequency domain is scheduled through PDCCH, a RNTI needs to be allocated for the SC-MCCH in advance, such as SC-MCCH RNTI=FFFB. It is also possible that SM-RNTI=FFFB, and SC-MCCH RNTI=FFFC. The time domain position information for sending SC-MCCH change notification information is indicated in the system broadcast message. The time domain position information includes a time domain frame period, a subframe position, and a repetition number of change notifications in one SC-MCCH modification period.

In Step 902, the UE reads configuration information of SC-MCCH change notification information.

The UE reads the configuration information of the SC-MCCH change notification information in the system broadcast message.

In Step 903, the UE monitors SC-MCCH change notification information.

The UE monitors the position of a subframe indicated by the system broadcast message. The monitoring means that the UE performs a mask operation on the CRC of the subframe using the SM-RNTI and verifying the CRC. If the verification is passed, the subframe is what is required. The UE further reads the content of the DCI in the PDCCH. The content of the DCI is the SC-MCCH change notification information.

In Step 904, the UE determines whether the SC-MCCH is updated, and if the SC-MCCH is updated, the process proceeds to Step 905, otherwise the process turns to Step 906.

The specific SC-MCCH change notification information is placed on the DCI in the PDCCH of the subframe, which may adopt DCI format-1c. If a bit N of the DCI is used in the notification message to indicate whether the SC-MCCH is updated or not, N=1 means that the SC-MCCH is updated at the next SC-MCCH MP, and N=0 indicates that SC-MCCH is unchanged.

In Step 905, the UE reads the updated SC-MCCH information.

The UE reads the updated SC-MCCH information immediately at the start of the next SC-MCCH modification period according to the SC-MCCH time domain position information indicated in the system broadcast message. Further, the UE may read the required SC-MTCH content according to the updated SC-MCCH information.

In Step 906, the UE receives the required SC-MTCH service according to the existing SC-MCCH information.

Second Embodiment

Figure 12:
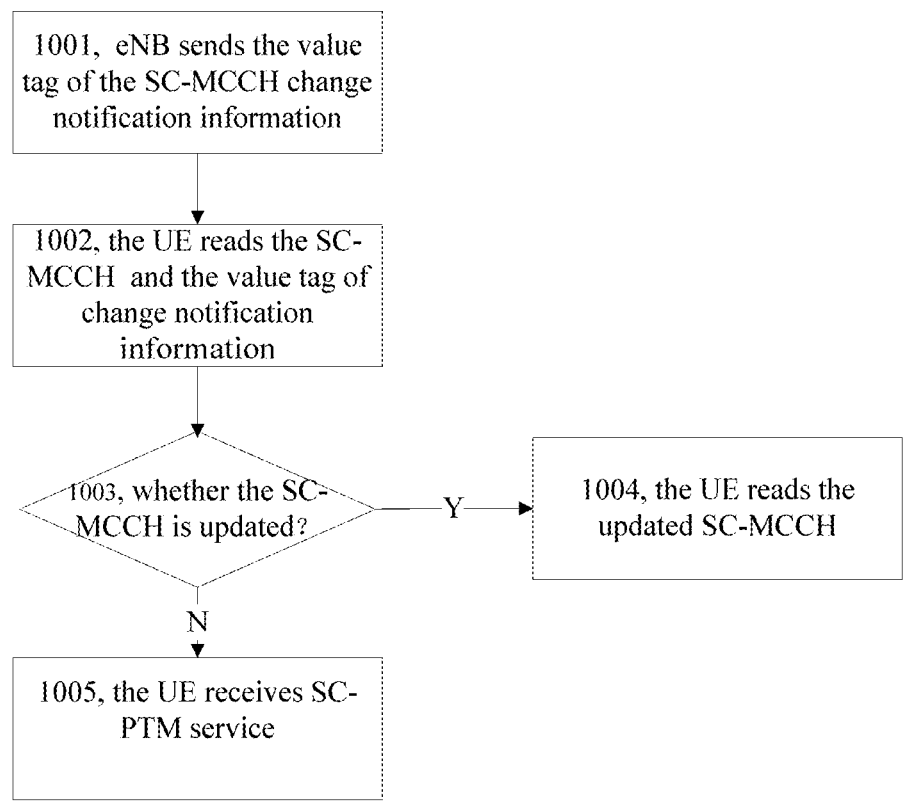
FIG. 12 is a flow chart of a second embodiment of the present disclosure.

The scenario in the embodiment is that the SC-MCCH change notification information is indicated by the value tag. FIG. 12 is a flowchart of the second embodiment of the present disclosure. As shown in FIG. 12, an example method includes the following steps.

In Step 1001, the base station eNB indicates the value tag of the SC-MCCH change notification information through the system broadcast message.

The system broadcast message is an existing MBMS system message, such as an SIB13 or an SIB15. The SC-MCCH is an MCCH corresponding to a single cell SC-PTM. The value tag refers to an integer field sc-mcch Value Tag setup in the system broadcast message for indicating SC-MCCH configuration. The field takes a value of (0 . . . 31). That is, the field may take any integer between 0 and 31. Each time the UE reads the configuration information of the SC-MCCH, the UE stores the value of sc-mcch Value Tag. If the UE finds that the value of sc-mcch Value Tag in the current system broadcast message is different from the value of sc-mcch Value Tag stored locally, it indicates that the SC-MCCH is updated, otherwise it indicates that the SC-MCCH is not changed.

In Step 1002, the UE receives the SC-MCCH information and the value tag of the SC-MCCH change notification information.

The UE indicates to receive the SC-MCCH information according to the system broadcast message and stores the value of the value tag in the system broadcast message.

In Step 1003, the UE determines whether the SC-MCCH is updated, and if the SC-MCCH is updated, the process proceeds to Step 1004, otherwise the process turns to Step 1005.

The UE determines whether the SC-MCCH is updated according to whether the value of the locally stored value tag is the same as the value tag in the newly received system broadcast message. If they are the same, it indicates that the SC-MCCH is not updated; if they are different, it indicates that the SC-MCCH has been updated.

In Step 1004, the UE reads the updated SC-MCCH information.

The UE reads the updated SC-MCCH information immediately at the start of the next SC-MCCH modification period according to the SC-MCCH time domain position information indicated in the system broadcast message. Further, the UE may read the required SC-MTCH content according to the updated SC-MCCH information.

In Step 1005, the UE receives the required SC-MTCH service according to the existing SC-MCCH information.

Third Embodiment

Figure 13:
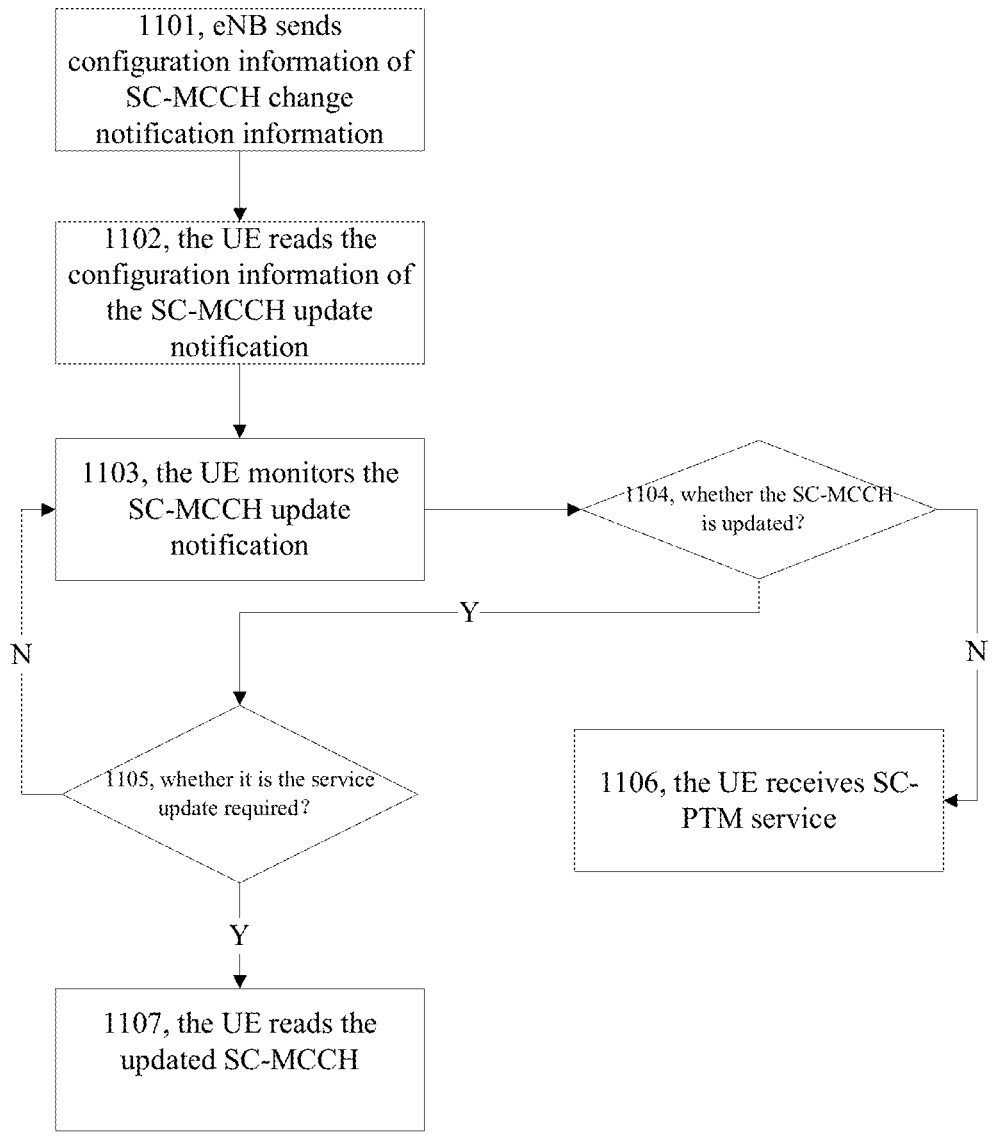
FIG. 13 is a flow chart of a third embodiment of the present disclosure.

The scenario in the embodiment is that SC-MCCH change notification information includes service type information. FIG. 13 is a flowchart of the third embodiment of the present disclosure. As shown in FIG. 13, an example method includes the following steps.

In Step 1101, the base station eNB indicates configuration information of SC-MCCH change notification information through a system broadcast message.

This step is the same as step 1101, and details are not described herein again.

In Step 1102, the UE reads the configuration information of the S-MCCH update notification.

In Step 1103, the UE monitors the S-MCCH update notification.

This step is the same as step 1103, and details are not described herein again.

In Step 1104, the UE determines whether the SC-MCCH is updated, and if the SC-MCCH is updated, the process proceeds to Step 1105, otherwise the process turns to Step 1107.

This step is the same as step 1104, and details are not described herein again.

In Step 1105, the UE determines whether it is the service update required, and if it is the service update required, the process proceeds to Step 1106, otherwise the process turns to Step 1103.

The SC-MCCH change notification information may indicate more service update related information by using two or more bits. That is, a service type may be indicated in the DCI. For example, two bits N are used for indication, where N1 indicates whether the SC-MCCH is updated, and N2 indicates the updated service type. For example, N2=1 indicates that the public safety (PS) service is updated, and N2=0 indicates that the normal service is updated. Further, more than two bits may be used in the DCI to indicate more update information.

If the update notification is indicated through the two bits, the UE determines, according to the value of N2, the updated service type, and if the UE is only interested in the public safety (PS) service, assuming that N1=1, that is, the SC-MCCH is updated. Then N2=1 indicates that the PS service is updated. The UE reads the updated SC-MCCH information. N2=0 indicates that the non-PS service is updated, and the UE does not read the updated SC-MCCH information.

In Step 1106, the UE receives the updated SC-MCCH information.

This step is the same as Step 1105, and details are not described herein again.

In Step 1107, the UE receives the required SC-MTCH service according to the existing SC-MCCH information.

Fourth Embodiment

Figure 14:
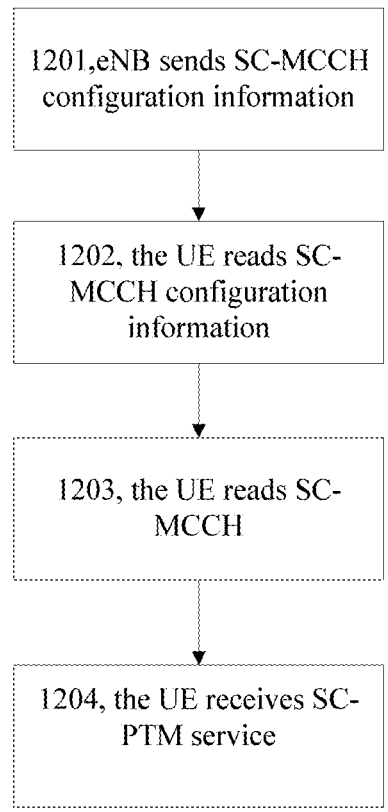
FIG. 14 is a flow chart of a fourth embodiment of the present disclosure.

The scenario in the embodiment is that the UE reads SC-MCCH information. FIG. 14 is a flowchart of the fourth embodiment of the present disclosure. As shown in FIG. 14, the embodiment includes the following steps.

In Step 1201, the base station eNB indicates SC-MCCH configuration information through a system broadcast message.

In Step 1202, the UE reads SC-MCCH configuration information.

In Step 1203, the UE reads SC-MCCH information.

In Step 1204, the UE reads SC-PTM service data.

Figure 15:
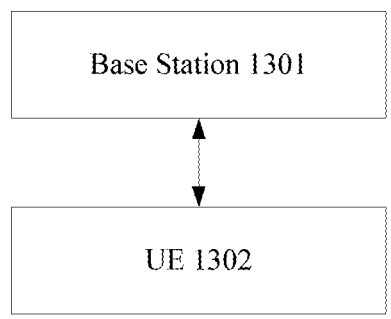
FIG. 15 is a schematic diagram of a configuration system for a single cell SC-MCCH of the present disclosure.

FIG. 15 is a schematic diagram of a configuration system for a single cell SC-MCCH of the present disclosure, which includes a base station eNB 1301 and a user equipment (UE) 1302.

The base station 1301 is configured to send a system broadcast message, a SC-MCCH message, SC-MCCH change notification information, SC-MTCH service data and frequency domain scheduling information of the SC-MCCH. The base station 1301 is also configured to scramble the CRC of SC-MCCH change notification information subframe and the SC-MCCH subframe with SM RNTI and SC-MCCH RNTI.

The UE 1302 is configured to receive the system broadcast message, the SC-MCCH message, the SC-MCCH change notification information, the SC-MTCH service data and the frequency domain scheduling information of the SC-MCCH sent by the base station 1301, and is also configured to detect the SC-MCCH change notification information subframe and the SC-MCCH subframe.

Figure 16:
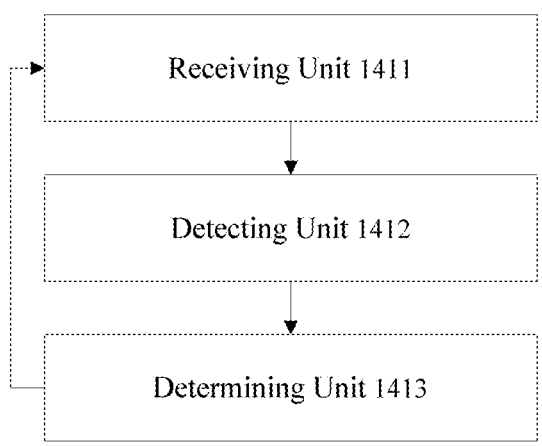
FIG. 16 is a schematic diagram of a single cell scheduling user equipment according to the present disclosure.

FIG. 16 is a schematic diagram of a single cell scheduling user equipment according to the present disclosure, including a receiving unit 1411, a detecting unit 1412, a determining unit 1413.

The receiving unit 1411 is configured to receive a system broadcast message, a SC-MCCH message, SC-MCCH change notification information, SC-MTCH service data and frequency domain scheduling information of the SC-MCCH.

The detecting unit 1412 is configured to detect the SC-MCCH change notification information subframe and the SC-MCCH subframe.

The determining unit 1413 is configured to determine whether the SC-MCCH is updated.

One or more embodiments further provide a storage medium. In one or more examples, the above storage medium may be configured to store program codes for performing the following steps.

In step S1, a base station sends a system broadcast message. The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is sent on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

It should be noted that, the above configuration information may also include at least one of: a repetition period (RP) of the SC-MCCH, configuration information of change notification information of the SC-MCCH and value tag information.

According to one or more embodiments the storage medium may include, but is not limited to, a U disk, a read-only memory (ROM), a random access memory (RAM), a mobile hard disk, a magnetic disc, a compact disc or a variety of media that can store program codes.

For a specific example in this embodiment, reference may be made to the examples described in the foregoing embodiments and optional embodiments, and details are not described herein again in this embodiment.

One or more embodiments further provide a storage medium. In one or more examples, the above storage medium may be configured to store program codes for performing the following steps.

In step S2, the user equipment (UE) receives a system broadcast message sent by a base station. The system broadcast message carries configuration information of a single cell multicast control channel SC-MCCH configured by the base station. The configuration information includes: a modification period (MP) of the SC-MCCH; time domain position information where the SC-MCCH is located; and frequency domain scheduling information of the SC-MCCH, which is received by the UE from the base station on a physical downlink control channel (PDCCH) of a subframe in which the SC-MCCH is located. The frequency domain scheduling information includes at least one of: frequency domain position information of the SC-MCCH; and a modulation and coding scheme (MCS) of the SC-MCCH.

In the embodiment of the present disclosure, the configuration information may further include at least one of: a repetition period (RP) of the SC-MCCH, configuration information of change notification information of the SC-MCCH and value tag information.

According to one or more embodiments, the storage medium may include, but is not limited to, a U disk, a read-only memory (ROM), a random access memory (RAM), a mobile hard disk, a magnetic disc, a compact disc or a variety of media that can store program codes.

For a specific example in this embodiment, reference may be made to the examples described in the foregoing embodiments and optional embodiments, and details are not described herein again in this embodiment.

Apparently, those skilled in the art should understand that each module or each step of the present disclosure described above can be implemented by a general purposed computing device, which can be centralized on a single computing device or distributed on a network formed by multiple computing devices, which may alternatively be implemented with program codes executable by a computing device so that they may be stored in a storage device for execution by a computing device. In some cases, the illustrated or described steps may be performed in a different order from that described herein, or they may be individually fabricated into individual integrated circuit modules, or multiple of them may be fabricated as a single integrated circuit module. As such, the present disclosure is not limited to any specific combination of hardware and software.

The foregoing descriptions are merely a few embodiments of the technical solutions provided by the present disclosure and are not intended to limit the technical solutions. Those skilled in the art, may identify various modifications and changes to the various embodiments described herein. Any modification, equivalent replacement, improvement, etc. within the spirit and principle of the present disclosure should be included in the protection scope of the present disclosure.

Industrial Applicability

As described above, embodiments of the technical solutions described in the present disclosure provide a resource configuration method, a resource configuration system and a resource configuration apparatus for a single cell multicast control channel SC-MCCH, which have at least the following beneficial effects. The technical solutions can solve the problem that there is no resource configuration method applicable for single cell multicast control channel SC-MCCH in the related art, and can realize resource configuration for the SC-MCCH.

What is claimed is:

1. A resource configuration method for a single cell multicast control channel SC-MCCH, comprising: sending, by a base station, a system broadcast message, wherein the system broadcast message carries configuration information of a single cell multicast control channel SC-MCCH, and the configuration information comprises: a modification period (MP) of the SC-MCCH and time domain position information where the SC-MCCH is located; and sending, by the base station, frequency domain scheduling information of the SC-MCCH on a physical downlink control channel (PDCCH), wherein the frequency domain scheduling information comprises at least one of: frequency domain position information of the SC-MCCH and a modulation and coding scheme (MCS) of the SC-MCCH, wherein the configuration information further comprises at least one of: a repetition period (RP) of the SC-MCCH, configuration information of change notification information of the SC-MCCH, wherein in response to the configuration information comprising configuration information of change notification information of the SC-MCCH, the change notification information of the SC-MCCH is indicated by downlink control information DCI in the physical downlink control channel (PDCCH), and in response to the change notification information of the SC-MCCH indicated by the downlink control information DCI, the method comprises: in response to the change notification information of the SC-MCCH only indicating whether the SC-MCCH is updated, a first designated bit N in the DCI is for indicating whether the SC-MCCH is updated, where N=1 is for indicating that the SC-MCCH is updated, and N=0 is for indicating that the SC-MCCH is not updated, and N takes a value of 1 or 0.

2. The method according to claim 1 wherein the MP is for indicating a period for changing the SC-MCCH, the RP is for indicating a period for the SC-MCCH to repeat a transmission in one MP, the time domain position information where the SC-MCCH is located is for indicating positions of a radio frame and a radio subframe where the SC-MCCH is located, and wherein the configuration information of the change notification information of the SC-MCCH is for indicating the time domain position information where the change notification information of the SC-MCCH is located, and the time domain position information where the change notification information of the SC-MCCH is located comprises the positions of the radio frame and radio subframe where the change notification information of the SC-MCCH is located.

3. The method according to claim 1, further comprising: when the change notification information of the SC-MCCH not only indicates whether the SC-MCCH is updated, but also indicates a service type of the SC-MCCH, a first designated bit N in the DCI is for indicating whether the SC-MCCH is updated, where N=1 is for indicating that the SC-MCCH is updated, and N=0 is for indicating that the SC-MCCH is not updated; and a second designated bit M in the DCI is for indicating a type of service that is updated for the SC-MCCH, where M=1 is for indicating update of public safety (PS) service, and M=0 is for indicating update of a normal service, N takes a value of 1 or 0, and M takes a value of 1 or 0.

4. The method according to claim 1, wherein the SC-MCCH is identified by a first radio network temporary identifier RNTI, and a change notification information of the SC-MCCH is identified by a second radio network temporary identifier RNTI.

5. A resource configuration method for a single cell multicast control channel SC-MCCH, comprising: receiving, by a user equipment (UE), a system broadcast message sent by a base station, wherein the system broadcast message carries configuration information of a single cell multicast control channel SC-MCCH, and the configuration information comprises: a modification period (MP) of the SC-MCCH and time domain position information where the SC-MCCH is located; and receiving, by the user equipment (UE), frequency domain scheduling information of the SC-MCCH sent by the base station on a physical downlink control channel (PDCCH), wherein the frequency domain scheduling information comprises at least one of: frequency domain position information of the SC-MCCH and a modulation and coding scheme (MCS) of the SC-MCCH, wherein the configuration information further comprises at least one of: a repetition period (RP) of the SC-MCCH, configuration information of change notification information of the SC-MCCH, wherein in response to the configuration information comprising configuration information of change notification information of the SC-MCCH, the change notification information of the SC- MCCH is indicated by downlink control information (DCI) in the physical downlink control channel (PDCCH), wherein after the user equipment (UE) receives the system broadcast message sent by the base station, the method further comprises: determining, by the UE, whether the SC-MCCH is updated according to the configuration information, and wherein determining by the UE whether the SC-MCCH is updated according to the configuration information comprises: acquiring, by the UE, a value of a first designated bit N in the DCI; when N is 1, determining, by the UE, that the SC-MCCH is updated, and when N is 0, determining, by the UE, that the SC-MCCH is not updated, and N takes a value of 1 or 0.

6. The method according to claim 5 wherein the MP is for indicating a period for changing the SC-MCCH, the RP is for indicating a period for the SC-MCCH to repeat a transmission in one MP, the time domain position information where the SC-MCCH is located is for indicating positions of a radio frame and a radio subframe where the SC-MCCH is located, the configuration information of the change notification information of the SC-MCCH is for indicating the time domain position information where the change notification information of the SC-MCCH is located, and the time domain position information where the change notification information of the SC-MCCH is located comprises the positions of the radio frame and radio subframe where the change notification information of the SC-MCCH is located.

7. The method according to claim 5, further comprising: when the SC-MCCH is updated, reading, by the UE, the updated information of the SC-MCCH.

8. The method according to claim 5, wherein when the change notification information of the SC-MCCH is indicated by the downlink control information (DCI), determining by the UE whether the SC-MCCH is updated according to the configuration information comprises: reading, by the UE, the configuration information of the change notification information of the SC-MCCH in the configuration information; monitoring, by the UE, the change notification information of the SC-MCCH at the position of the subframe where the SC-MCCH is located as indicated by the configuration information of the change notification information of the SC-MCCH; and determining, by the UE, whether the SC-MCCH is updated according to the change notification information of the SC-MCCH.

9. The method according to claim 8, wherein after the UE determines whether the SC-MCCH is updated according to the configuration information, the method further comprises: determining, by the UE, whether a service of the SC-MCCH is updated according to the DCI; and when the service of the SC-MCCH is updated, receiving, by the UE, the updated SC-MCCH information.

10. The method according to claim 9, wherein determining by the UE whether the service of the SC-MCCH is updated according to the DCI comprises: acquiring, by the UE, a value of a second designated bit M in the DCI; when M is 1, determining, by the UE, that public safety (PS) service of the SC-MCCH is updated; and when M is 0, determining, by the UE, that the normal service of the SC-MCCH is updated, and M takes a value of 1 or 0.

11. The method according to claim 7, wherein reading by the UE the updated information of the SC-MCCH comprises: reading, by the UE, the updated SC-MCCH information from a starting time of a next MP according to the time domain position information of the SC-MCCH.

12. A resource configuration apparatus for a single cell multicast control channel SC-MCCH, which is applied to a user equipment (UE), and the apparatus comprising a computing device and a storing device which stores computer-executable instructions therein, wherein the computer-executable instructions, when executed by the computing device, causes the computing device to: receive a system broadcast message sent by a base station, wherein the system broadcast message carries configuration information of a single cell multicast control channel SC-MCCH, the configuration information comprises: a modification period (MP) of the SC-MCCH; time domain position information where the SC-MCCH is located; and frequency domain scheduling information of the SC-MCCH, which is sent by the base station on a physical downlink control channel (PDCCH), wherein the frequency domain scheduling information comprises at least one of: frequency domain position information of the SC-MCCH; and a modulation and coding scheme (MCS) of the SC-MCCH, wherein the configuration information further comprises at least one of: a repetition period (RP) of the SC-MCCH, configuration information of change notification information of the SC-MCCH, wherein in response to the configuration information comprising configuration information of change notification information of the SC-MCCH, the change notification information of the SC-MCCH is indicated by downlink control information (DCI) in the physical downlink control channel (PDCCH), and wherein the computer-executable instructions, when executed by the computing device, further causes the computing device to determine whether the SC-MCCH is updated according to the configuration information by: acquiring a value of a first designated bit N in the DCL; when N is 1, determining that the SC-MCCH is updated; and when N is 0, determining that the SC-MCCH is not updated, and N takes a value of 1 or 0.

13. The apparatus according to claim 12, wherein the computer-executable instructions, when executed by the computing device, further causes the computing device read the updated information of the SC-MCCH when the SC-MCCH is updated.

* * * * *